United States Patent [19]

Thomsen

[11] Patent Number: 4,474,476
[45] Date of Patent: Oct. 2, 1984

[54] CHEMICAL PRINTING LIQUID METHOD AND SYSTEM

[76] Inventor: Jack Thomsen, 13701 Hubbard St., #9, Sylmar, Calif. 91342

[21] Appl. No.: 405,562

[22] Filed: Aug. 5, 1982

[51] Int. Cl.³ .................... G05D 11/02; B01F 15/04
[52] U.S. Cl. ................................. 366/152; 101/451; 137/93; 137/101.25; 366/153
[58] Field of Search ............... 366/152, 153, 154, 155, 366/151, 136, 137; 101/147, 148, 451; 137/93, 5, 101.25

[56] References Cited

U.S. PATENT DOCUMENTS 4,146,474  3/1979  Kagatani ........................... 101/147
4,172,880 10/1979  Tzavos ............................... 137/93
4,209,258  6/1980  Oakes ................................ 366/152

Primary Examiner—Robert W. Jenkins

[57] ABSTRACT

An improved method and system for properly supplying and mixing printing chemicals and liquid diluent and for supplying the resulting liquid is provided. The method and system feature the use of periodic or continuous monitoring of the ph and/or electrical conductivity level of the printing liquid in a mixing zone to regulate the flow of initial and make-up chemicals to the zone, so that the proper concentration of chemicals is maintained in the liquid. The liquid is at least periodically removed from the mixing zone and make-up diluent is at least periodically added to the mixing zone. The method can be successfully run on a batch, semi-continuous or continuous basis and the system employs an automatic electronic ph and/or electrical conductivity analyzer and signal generator to automatically control signal responsive pumps in the conduit line(s) from the chemical supply zone(s) to the mixing zone. Preferably, automatic liquid level regulating means are provided in the mixing zone, along with an annular drip tube, circulating pump, exit and return lines and the like. The system and method are simple, economical, durable and highly efficient for making up proper levels of printing liquids for offset printing and the like.

14 Claims, 2 Drawing Figures

CHEMICAL PRINTING LIQUID METHOD AND SYSTEM

BACKGROUND OF THE INVENTION

1. Field of the Invention

The present invention generally relates to printing liquids and more particularly to an improved method and system for making up printing and for maintaining the proper chemical concentrations in the liquid.

2. Prior Art

Conventional off-set printing liquid mixing equipment and methods mix water or other liquid diluent and printing chemicals together on a weight of chemicals per volume of diluent bases or on a volume of chemicals per volume of diluent basis, after which the chemical blend is pumped to the printing press. Unfortunately, certain problems commonly arise. For example, the strength of the raw chemicals employed usually fluctuates from time to time, so that the resulting chemical blend also fluctuates in strength, inevitably producing variable printing results. Changes in system temperature also result in changes in chemical concentration as volume relationships change. Evaporation of water and other diluents also occurs to change the strength of the chemical blend.

Accordingly, there exists a need for an improved system and method for making up and resupplying chemical printing liquid for offset printing and the like to and assuring that the resulting blend is maintained uniform in chemical concentration, regardless of variations in strength of the chemicals supplied, the temperature of the blend, evaporation in the mixing tank, etc.

SUMMARY OF THE INVENTION

The improved method and system of the present invention satisfy all the foregoing needs. The method and system are substantially as set forth in the Abstract above. Thus, the level of liquid diluent such as water is maintained, such as by a float, in a mixing zone, even though liquid is at least periodically withdrawn from the zone for use. The concentration of printing chemicals in the liquid is also maintained within close limits by supplying the chemicals automatically at least periodically in response to the monitored ph and/or electrical conductivity of the printing liquid in the mixing zone. Thus, as blended liquid is withdrawn from the mixing zone and used for printing, the liquid level in the mixing zone begins to drop, causing the float to allow make-up liquid diluent to pass into the mixing zone. This tends to change the electrical conductivity and ph of the blended liquid in the mixing zone, which change is detected by a probe connected to a controller. The controller generates a signal to temporarily open the valve(s) of one or more supply conduits running from printing chemical holders, until the signal terminates, due to adjustment of the ph and/or electrical conductivity of the blended liquid in the mixing zone to the required valve. This precise regulating and maintenance of the strength and quality of the blended liquid results in superior printing due to the more uniform nature of the blended printing liquid, in contrast to conventional printing liquids. The present system and method are simple, inexpensive, automative and efficient. Further features thereof are set forth in the following detailed description and accompanying drawings.

DETAILED DESCRIPTION OF THE PREFERRED EMBODIMENTS

Figure 1:
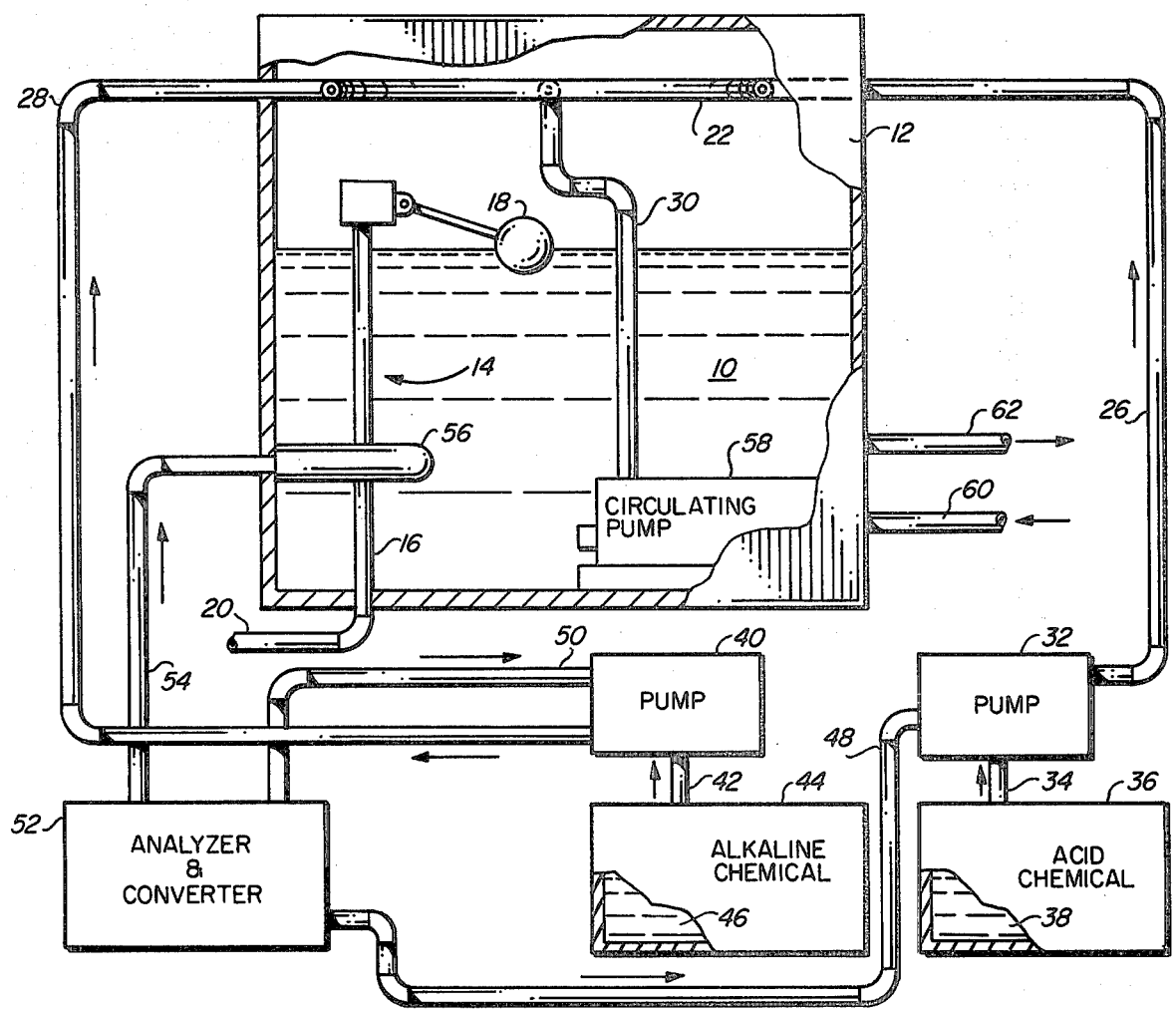
FIG. 1 is a schematic flow diagram of a preferred embodiment of the improved system of the present invention; and, FIG. 2 is a schematic fragmentary bottom plan view of a preferred embodiment of the annular drip tube mixer used in the mixing zone depicted in FIG. 1.
Figure 2:
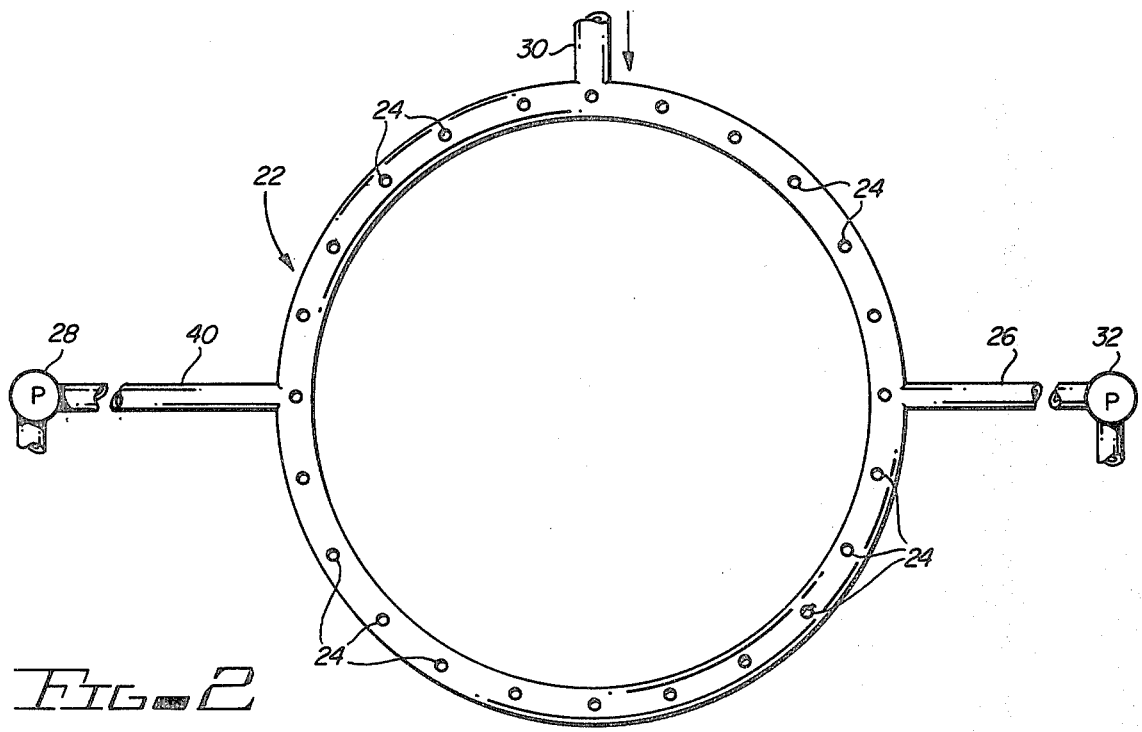

FIGS. 1 and 2

Now referring more particularly to FIG. 1 of the accompanying drawings, a schematic flow diagram is set forth therein depicting a preferred embodiment of the present system and method. Thus, system 10 is shown which includes a mixing tank 12 within which are disposed a device 14 comprising a standpipe 16 and float 18 for regulating the level of blended liquid 19 in tank 12. Pipe 16 is connected to a supply pipe 20 running from a source of liquid diluent, such as water or the like.

Tank 12 also has an annular mixing and drip tube 22 (FIGS. 1 and 2) mounted horizontally above the liquid level in tank 12. Tube 22 has a plurality of openings 24 extending from the hollow interior thereof to the lower surface thereof and spaced around the bottom of tube 22. Tube 22 is also provided with a supply of conduits 26, 28 and 30 spaced around the periphery thereof. Conduit 26 has a supply or impeller pump 32 disposed therein. Pump 32 is connected by conduit 34 to a container 36 containing an acid printing chemical 38. Similarly, conduit 28 is provided with a supply or impeller pump 40 connected by a conduit 42 to a container 44 containing a supply of alkaline printing chemical 46.

Pump 32 and pump 40 are also connected by electrical conduits 48 and 50, respectively, with a controller 52 of conventional design which includes an automatic computer controlled analyzer and electrical signal generator (not shown). The analyzer portion of controller 52 is connected by electrical conduit 54 with a probe 56 within tank which measures periodically or continuously the ph and/or electrical conductivity of blended printing liquid 19 in tank 12.

Controller 52 causes electrical signal to be generated by its generator section in response to the monitored ph and/or electrical conductivity level when that level varies from a predetermined and preset narrow range of valves. Such signal is transmitted through conduits 48 and 50 to temporarily open and operate one or both pumps 32 and 40, respectively, to cause acid chemical 38 and/or alkaline chemical 46 to pass separately through conduits 26 and 28, respectively, to drip tube 22.

It will be understood that acid chemical 38 and alkaline chemical 46 are each preferably in the form of a readily pumpable concentrated liquid dispersion or solution readily mixable in drip tube 22 with liquid passing into tube 22 from conduit 30. Conduit 30 is connected to the exit end of circuating pump 58, in turn connected to a return conduit 60 for passage of spent or unused printing liquid 19 back to tank 12. This spent or unused liquid 19 is passed through pump 58 and conduit 30 to tube 22 and dilutes chemicals 38 and 46, after which the resulting mix is dripped through openings 24 down to the upper surface of the main body of printing liquid 19 in tank 12 for blending therewith. Pump 58 has the added function of recirculating the main body of printing liquid 19 to assure a completely uniform blend thereof in tank 12. Such blend is continuously or intermittently removed from tank 12 through exit conduit 62 and passes therein to an off-set printer or other printing device (not shown).

Thus, system 10 can be successfully operated on a batch, semi-continous or continuous basis with a periodic or continuous flow of a uniformly blended printing liquid 19 from tank 12. Continous or intermittent flow of make-up liquid into tank 12 to keep the liquid level thereof constant also occurs, along with a periodic or continous flow of make-up chemicals 32 and/or 46 into tank 12 to keep the chemical composition of liquid 19 totally inform.

It will be understood that the present method can be practiced utilizing equipment other than that described for the present system and that the present system can, if desired, employ radio acoustic or audio signals in place of electrical signals to control the operation of signal responsive pumps 32 and 40. Moreover, return line 60 can be eliminated so that spent printing liquid does not return to tank 12 but, instead, only fresh liquid 19 is recirculated through pump 58 and conduit 30 to tube 22. Tube 22 could also be used to uniformly distribute chemicals 38 and 46 in tank 12.

The components of system 10 in any event can be fabricated of conventional or other materials, as desired. Certain features of the method and system of the present invention are further illustrated by the following specific examples.

EXAMPLE I

System 10 schematically illustrated in FIG. 1 and previously described is used to make up and maintain a body of printing liquid 19. Mixing tank 12 contains liquid 19 and has the following dimensions and volume capacity: 18×12×; 24 capacity 22 gallons. It is kept by float 18 approximately two thirds full of printing liquid 19, which has the following composition:

TABLE I

| Ingredients | Concentration (% by weight) |
|---|---|
| Water | 75% |
| Acid | 25% |

A ph measuring probe 54 is mounted in tank 12 and electrically connected to a controller 52 (analyzer and signal generator) in turn electrically connected to diaghragm pumps 32 and 40. Controller 52 is specifically described as follows: Signet Scientific MK 702. Pumps 32 and 40 operate at 4.0 gpm flow rate and are connected to respectively, containers 36 and 44, each of them having a volume of 55 gallons. Container 36 contains a solution of acid chemicals in water as follows:

TABLE II

| Ingredients | Concentration (% by weight) |
|---|---|
| Water | 10% |
| Acid | 90% |

Container 42 contains a solution of alkaline chemicals in water as follows:

TABLE III

| Ingredients | Concentration (% by weight) |
|---|---|
| Water | 10% |
| Alkaline | 90% |

Lines 26 and 28 pass acid chemical 38 and alkaline chemicals 46, respectively, separately to drip tube 22 which is of 1" o.d. pipe having a circumference of 3.1416". A plurality of ⅛" diameter holes 24 spaced 1" apart perforate the bottom of tube 22.

Circulating pump 58 circulates freshly blend printing liquid 19 in tank 12 at the rate of 0.50 gpm, while simultaneously supplying spent printing liquid 19 (returned through conduit 60) through conduit 30 to tube 22 for mixing wich chemicals 38 and 46 and distribution through holes 24. Fresh liquid 19 is dispensed from tank 12 continuously through line 62 at the rate of about 5 gpm.

Controller 52 is set so that when the ph continuously monitored by probe 45 varies by, for example, more than 0.05 from the selected valve, controller 52 activates its signal generator and a signal is sent to one of pumps 40 and 32, depending on whether the ph is above or below the desired valve, so that the ph of liquid 19 in tank 12 becomes quickly adjusted to within 0.05 of the desired value, after which the signal ceases and the affected pump closes. Controller 52 also includes an override device (not shown) which allows signals to be sent to both pumps 32 and 40 so as to raise the general chemical concentration level of liquid 19 with both acid chemicals 38 and alkaline chemical 46 to a desired range. System 10 thus operates successively and mainly automatically over a long period of time.

EXAMPLE II

The system and method of Example I are employed, except that printing liquid 19 has the following composition:

TABLE IV

| Ingredients | Concentration (% by weight) |
|---|---|
| Water | 10% |
| Acid | 90% |

Moreover, probe 56 has a dual function, measuring ph and electrical condutivity as a measure of both the chemical imbalance and overall chemical concentration in liquid 19. When the overall chemical concentration is below a preset valve, the override device causes both pumps 32 and 40 to operate simultaneously until the over all concentration of chemicals in liquid 19 reaches the desired range. Container 36 contains the following liquid solution:

TABLE V

| Ingredients | Concentration (% by weight) |
|---|---|
| Water | 5% |
| Acid | 95% |

Container 42 contains the following solution:

TABLE VI

| Ingredients | Concentration (% by weight) |
|---|---|
| Water | 10% |
| Alkaline | 90% |

Operation of tank 12 is on a continous basis, but no spent liquid 19 is returned thereto through line 60. Liquid 19 exits line 62 at the rate of 5 gpm. Successful continuous operation continues for more than one month without substantial interruption.

It will be understood that the specific composition of liquid 19 can vary widely, as can the flow rates types of chemicals used, desired ph and electrical conductivity levels, etc. of liquid 19, all without adversely affecting the successful operation of the method and system of the present invention. Various other changes, modifications, alterations and additions can be made in the present method, its steps and parameters. All such changes, modifications, alterations and additions as are within the scope of the present claims form part of the present invention.

What is claimed is:

1. An improved chemical blender system for offset printing, said system comprising, in combination:
   a. a liquid printing chemical mixing tank;
   b. liquid diluent conduit means connected to said tank and automatic liquid level control means in said tank for controlling the ingress of liquid diluent to said tank;
   c. liquid pre-mixing means;
   d. circulating means for circulating liquid in said tank;
   e. at least one container of printing chemical; and
   f. automatic chemical concentration control means, including
      i. an automatic signal generating controller,
      ii. a ph and/or electrical conductivity probe extending into said tank and connected to said controller and,
      iii. pump and conduit means connected to said container and said tank, said pump means also being connected to and actuatable by said controller to meter said chemical into said pre-mixing means in response to signals from said controller for subsequent transmission to said mixing tank liquid whereby, as the liquid in said tank decreases and liquid make-up diluent is added thereto, the concentration of said printing chemical in such tank fluctuates, changing in ph and/or electrical conductivity of the mixed liquid in said tank, said changes automatically causing said controller to generate signals to effect metering of make-up amounts of said chemicals to said pre-mixing means and thereafter to said tank liquid, for adjusting the desired concentration level of said printing chemicals in said tank liquid.

2. The improved chemical blender system of claim 1 wherein said pre-mixing means includes an annular drip tube above the liquid level in said tank, and to which said chemical conduits are connected.

3. The improved chemical blender system of claim 2 wherein said system includes printing liquid exit and return conduits connected to said tank, and wherein said system includes separate containers of alkaline printing chemicals and acid printing chemicals.

4. The improved chemical blender system of claim 3 wherein said circulating means comprises a circulating pump in said tank, wherein said return conduit is connected to said circulating pump, and wherein a conduit connects to the exit oof said circulating pump and said pre-mixing means for delivery of spent liquid to said pre-mixing means.

5. The improved chemical blender system of claim 1 wherein said controller includes a computerized analyzer and signal generator.

6. The improved chemical blender system of claim 1 wherein said probe monitors ph.

7. The improved chemical blender system of claim 1 wherein said probe monitors electrical conductivity.

8. An improved method of preparing and supplying a liquid printing chemical blend for offset printing, said method comprising:
   (a) maintaining the level of liquid diluent in a mixing tank;
   (b) maintaining the concentration level of printing chemical in said liquid by (i) monitoring at least one of the ph and electrical conductivity of said liquid diluent (ii) supplying printing chemical to a pre-mixing means in response to the ph level or electrical conductivity of said liquid as deleted by said monitoring;
   (c) at least periodically removing fresh printing liquid from said mixing tank for use; and,
   (d) at least periodically supplying make-up diluent to said pre-mixing means and at least periodically supplying make-up printing chemical to said pre-mixing means in response to the monitored ph and/or electrical conductivity level of said liquid in said tank.

9. The improved method of claim 8 wherein said chemical and diluent are uniformly mixed and circulated in said pre-mixing means.

10. The improved method of claim 9 wherein said method is substantially continuous with fresh liquid exiting said tank for use and spent liquid being returned to said pre-mixing means for reuse.

11. The improved method of claim 10 wherein said monitoring is substantially continous and said flow of printing chemical and liquid diluent to said pre-mixing means are also substantially continous.

12. The improved method of claim 8 wherein said monitoring is effected by a probe connected to a computer analyzer and signal generator and wherein said printing chemical is automatically supplied to said pre-mixing means by pump and conduit means from a supply zone, said pump means being responsive to signals from said signal generator.

13. The improved method of claim 8 wherein said monitoring is ph monitoring and said printing chemicals comprise acidic chemicals and alkaline chemicals maintained in separate supply zones.

14. The improved method of claim 8 wherein said monitoring is electrical conductivity monitoring and said printing chemicals comprise acidic chemicals and alkaline chemicals maintained in separate supply zones.

* * * * *